(12) United States Patent
Zhang et al.

(10) Patent No.: US 11,945,905 B2
(45) Date of Patent: Apr. 2, 2024

(54) VEGETABLE OIL-DERIVED EPOXY COMPOSITIONS HAVING IMPROVED PERFORMANCE

(71) Applicant: Washington State University, Pullman, WA (US)

(72) Inventors: Jinwen Zhang, Pullman, WA (US); Tuan Liu, Pullman, WA (US)

(73) Assignee: Washington State University, Pullman, WA (US)

( * ) Notice: Subject to any disclaimer, the term of this patent is extended or adjusted under 35 U.S.C. 154(b) by 456 days.

(21) Appl. No.: 17/291,143

(22) PCT Filed: Nov. 7, 2019

(86) PCT No.: PCT/US2019/060242
§ 371 (c)(1),
(2) Date: May 4, 2021

(87) PCT Pub. No.: WO2020/097314
PCT Pub. Date: May 14, 2020

(65) Prior Publication Data
US 2021/0371579 A1 Dec. 2, 2021

Related U.S. Application Data

(60) Provisional application No. 62/757,031, filed on Nov. 7, 2018.

(51) Int. Cl.
| | | |
|---|---|---|
| B32B 41/00 | (2006.01) |
| C08G 59/06 | (2006.01) |
| C08G 59/12 | (2006.01) |
| C08G 59/42 | (2006.01) |
| C08G 59/50 | (2006.01) |
| C08J 5/24 | (2006.01) |
| C09D 163/08 | (2006.01) |
| C09J 5/00 | (2006.01) |
| C09J 163/08 | (2006.01) |

(52) U.S. Cl.
CPC ............ C08G 59/12 (2013.01); C08G 59/06 (2013.01); C08G 59/4238 (2013.01); C08G 59/502 (2013.01); C08J 5/243 (2021.05); C09D 163/08 (2013.01); C09J 5/00 (2013.01); C09J 163/08 (2013.01); C08J 2363/08 (2013.01); C09J 2463/00 (2013.01)

(58) Field of Classification Search
CPC .... C08G 59/12; C08G 59/06; C08G 59/4238; C08G 59/502; C08G 59/4215; C08G 59/3218; C08G 59/14; C08G 59/38; C08J 5/243; C08J 2363/08; C09D 163/08; C09J 5/00; C09J 163/08; C09J 2463/00
USPC .................... 156/60, 64, 350, 351, 378, 379
See application file for complete search history.

(56) References Cited

U.S. PATENT DOCUMENTS

| | | |
|---|---|---|
| 4,933,382 A | 6/1990 | Kitagawa et al. |
| 2007/0088147 A1 | 4/2007 | Lee et al. |
| 2015/0284502 A1 | 10/2015 | LaPinte et al. |
| 2015/0344816 A1 | 12/2015 | Zhang et al. |

OTHER PUBLICATIONS

Luo, L. et al., "An Epoxy-Ended Hyperbranched Polymer as a New Modifier for Toughening and Reinforcing in Epoxy Resin", Journal of Applied Polymer Science, 2013.

*Primary Examiner* — Michael N Orlando
*Assistant Examiner* — Joshel Rivera
(74) *Attorney, Agent, or Firm* — WC&F IP

(57) ABSTRACT

Embodiments of this invention are directed to bio-based epoxy compositions, and method of their preparation and use. Other embodiments are directed to cured bio-based epoxies, and manufactured articles having bio-based epoxy coatings, adhesives, or composites.

14 Claims, No Drawings

VEGETABLE OIL-DERIVED EPOXY COMPOSITIONS HAVING IMPROVED PERFORMANCE

BACKGROUND

Technical Field

The present disclosure is generally directed to bio-based epoxy compositions, methods for their preparation and use, such as for coatings, adhesives, and epoxy composites.

Description of the Related Art

Epoxy resins are widely used as matrix polymers for preparations of composites, adhesives, coatings, and electrical materials because of their balanced mechanical performance, processability, versatility, chemical resistance, low shrinkage and other properties. Currently, over 90% of commercial epoxy resins are derived from the non-renewable petrochemical bisphenol A (BPA). However, BPA is an endocrine disruptor and thus may cause harm to human health. The increasing demand of epoxy materials propels researchers to develop appropriate substitutes for BPA epoxy.

Use of renewable and nontoxic feedstocks for epoxies is a desirable strategy from the perspectives of both sustainable development and human health protection. In the recent decade, a variety of bio-based epoxies have been developed using renewable lignin, rosin, plant oil, etc., as feedstocks. Perhaps, the mostly investigated bio-epoxies are based on vegetable oils because of their abundant resources and competitive cost with respect to BPA epoxy resins. However, most of the vegetable oil epoxies, such as epoxidized soybean oil, which is built on the triglyceride structure and bears internal epoxide groups, exhibit low reactivity, inadequate mechanical properties, and poor heat resistance. The applications of vegetable oil-based epoxies are usually limited to the additives or modifiers for BPA epoxy resins with relatively low loading level (<10 wt. %). The recently developed glycidyl ester type of bio-epoxies based on structures of fatty acid derived vegetable oils, when used for epoxy materials, show a similar curing reactivity as the BPA epoxies and exhibit much higher thermal and mechanical properties than epoxidized vegetable oils (US 2018/0065915). However, for use in certain applications, fatty acid-derived bio-based epoxies alone in matrix resins do not meet performance standards for high glass transition temperature ($T_g$), modulus, and strength, which are met by BPA-based epoxies. In addition, adhesion of the fatty acid epoxies to substrates is also inferior to the adhesion properties of BPA epoxies. Therefore, there is a great need to develop compositions and methods to improve the overall application properties of bio-based epoxies, such as fatty acid epoxies and triglyceride-based epoxies.

SUMMARY

In brief, embodiments of the present disclosure provide epoxy compositions comprising an epoxy derivable from one or more fatty acids an aromatic non-coplanar triepoxy, and optionally a hyperbranched prepolymer. Methods of producing a cured epoxy from such epoxy compositions, and the resulting cured epoxies are also provided.

In one embodiment, compositions comprising a fatty acid epoxy derivable from one or more unsaturated fatty acids and an aromatic non-coplanar triepoxy are provided.

In one embodiment, compositions comprising a fatty acid epoxy derivable from one or more unsaturated fatty acids; a hyperbranched prepolymer having terminal groups comprising epoxide groups, hydroxyl groups, carboxyl groups, or a combination thereof; and an aromatic non-coplanar triepoxy are provided.

Such compositions are useful for producing cured epoxies, and articles comprising a cured epoxy.

In another embodiment, methods of producing a cured epoxy comprising mixing an epoxy composition as provided herein with a curing agent to produce a curing mixture, and polymerizing the curing mixture by maintaining the curing mixture at a temperature and time sufficient for polymerizing the epoxy composition, thereby producing a cured epoxy, are provided.

In another embodiment, cured epoxies comprising a polymerized reaction product of an epoxy composition as described herein and one or more curing agents are provided.

In another embodiment, articles comprising a cured epoxy as described herein are provided. In certain embodiments, articles comprising a surface coated with a coating comprising a cured epoxy as described herein are provided. In certain embodiments, structures comprising a first surface and an opposing second surface joined by an adhesive bonded to the first surface and the opposing second surface, the adhesive comprising a cured epoxy as described herein. In certain embodiments, composite articles comprising fibers or particles of a matrix material embedded within the polymerization product of a cured epoxy as described herein are also provided.

These and other aspects of the disclosure will be apparent upon reference to the following detailed description.

DETAILED DESCRIPTION

In the following description, certain specific details are set forth in order to provide a thorough understanding of various embodiments of the disclosure. However, one skilled in the art will understand that the disclosure may be practiced without these details.

Unless the context requires otherwise, throughout the present specification and claims, the word "comprise" and variations thereof, such as, "comprises" and "comprising" are to be construed in an open, inclusive sense, that is, as "including, but not limited to".

In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as polymer subunits, size, or thickness, are to be understood to include any integer within the recited range, unless otherwise indicated. As used herein, the terms "about" and "approximately" mean±20%, ±10%, ±5% or ±1% of the indicated range, value, or structure, unless otherwise indicated. It should be understood that the terms "a" and "an" as used herein refer to "one or more" of the enumerated components. The use of the alternative (e.g., "or") should be understood to mean either one, both, or any combination thereof of the alternatives.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless defined otherwise, all technical and scientific terms used herein have the same meaning as is commonly understood by one of skill in the art to which this disclosure belongs. As used in the specification and claims, the singular form "a", "an" and "the" include plural references unless the context clearly dictates otherwise.

"Alkylene" or "alkylene chain" refers to a straight or branched divalent hydrocarbon chain linking the rest of the molecule to a radical group, consisting solely of carbon and hydrogen, containing no unsaturation, and having from one to twelve carbon atoms, e.g., methylene, ethylene, propylene, n-butylene, ethenylene, propenylene, n-butenylene, propynylene, n-butynylene, and the like. The alkylene chain is attached to the rest of the molecule through a single bond and to the radical group through a single bond. The points of attachment of the alkylene chain to the rest of the molecule and to the radical group can be through one carbon or any two carbons within the chain. Unless stated otherwise specifically in the specification, alkylene is optionally substituted.

"Alkenylene" or "alkenylene chain" refers to a straight or branched divalent hydrocarbon chain linking the rest of the molecule to a radical group, consisting solely of carbon and hydrogen, containing at least one carbon-carbon double bond and having from two to twelve carbon atoms, e.g., ethenylene, propenylene, n-butenylene, and the like. The alkenylene chain is attached to the rest of the molecule through a single bond and to the radical group through a double bond or a single bond. The points of attachment of the alkenylene chain to the rest of the molecule and to the radical group can be through one carbon or any two carbons within the chain. Unless stated otherwise specifically in the specification, alkenylene is optionally substituted.

"Unsaturated fatty acid" refers to a fatty acid having at least one double bond in the carbon chain.

"Polyunsaturated fatty acid" refers to a fatty acid having at least two double bonds in the carbon chain.

"Epoxy" or "epoxy resin" as used herein refers to a material containing one or more compounds having polymerizable epoxide groups.

"Epoxide" refers to a cyclic ether with a three-atom ring.

"Fatty acid epoxy" refers to an epoxy that is derivable from a fatty acid. For detailed methods of deriving an epoxy from a fatty acid see Li, R. et al., *ACS Sustainable Chem. Eng.* 2018, 6, 4016-4025 and US 2018/0065915.

"Methoxy" refers to —OCH$_3$.

"Ethoxy" refers to —OCH$_2$CH$_3$.

"Non-coplanar triepoxy" refers to a compound having three epoxide groups with at least two of the epoxide groups being non-coplanar (i.e., not lying within the same plane). In some embodiments, each of the three epoxide groups are non-coplanar with the other two epoxide groups.

"Bio-triepoxy" refers to a triepoxy compound that is derived from a plant based source material.

"Weight average molecule weight" is a molecular weight measurement that accounts for the weight of each molecule in a polymer composition, and can be calculated as described in Shrivastava, A., Chapter 2—Polymerization. Introduction to Plastics Engineering. William Andrew Publishing, 2018, 17-18.

"Bisphenol A based epoxy" or "BPA based epoxy" refers to an epoxy composition with a main epoxy component (compound containing one or more epoxide groups) that is derived from BPA. An example of a BPA based epoxy is an epoxy composition that contains BPA diepoxy at a concentration of 50% or more, based on the total weight of the epoxy composition.

A "stereoisomer" refers to a compound made up of the same atoms bonded by the same bonds but having different three-dimensional structures, which are not interchangeable.

The present invention contemplates various stereoisomers and mixtures thereof and includes "enantiomers", which refers to two stereoisomers whose molecules are nonsuperimposeable mirror images of one another.

The compounds of the disclosure, or their pharmaceutically acceptable salts may contain one or more asymmetric centres and may thus give rise to enantiomers, diastereomers, and other stereoisomeric forms that may be defined, in terms of absolute stereochemistry, as (R)- or (S)- or, as (D)- or (L)- for amino acids. In some embodiments, the present invention is meant to include all such possible isomers, as well as their racemic and optically pure forms. Optically active (+) and (−), (R)- and (S)-, or (D)- and (L)-isomers may be prepared using chiral synthons or chiral reagents, or resolved using conventional techniques, for example, chromatography and fractional crystallisation. Conventional techniques for the preparation/isolation of individual enantiomers include chiral synthesis from a suitable optically pure precursor or resolution of the racemate (or the racemate of a salt or derivative) using, for example, chiral high pressure liquid chromatography (HPLC).

The chemical naming protocol and structure diagrams used herein are a modified form of the I.U.P.A.C. nomenclature system, using the ChemDraw Version 10 software naming program (CambridgeSoft). In chemical structure diagrams, all bonds are identified, except for some carbon atoms, which are assumed to be bonded to sufficient hydrogen atoms to complete the valency.

"Optional" or "optionally" means that the subsequently described event of circumstances may or may not occur, and that the description includes instances where said event or circumstance occurs and instances in which it does not. When a functional group is described as "optionally substituted," and in turn, substituents on the functional group are also "optionally substituted" and so on, for the purposes of this invention, such iterations are limited to five, preferably such iterations are limited to two.

Compounds for Use in the Epoxy Compositions

Fatty Acid-Derived Epoxy

As noted in the Summary of the Invention, epoxy compositions of the present disclosure include a fatty acid epoxy. In embodiments, the fatty acid epoxy is derived from one or more unsaturated fatty acids. In particular embodiments, the fatty acid epoxy is derived from one or more polyunsaturated fatty acids. In particular embodiments, the one or more unsaturated fatty acids are selected from linoleic acid, linolenic acid, and eleostearic acid.

In some embodiments, the fatty acid epoxy comprises one or more compounds having a structure of Formula (IV):

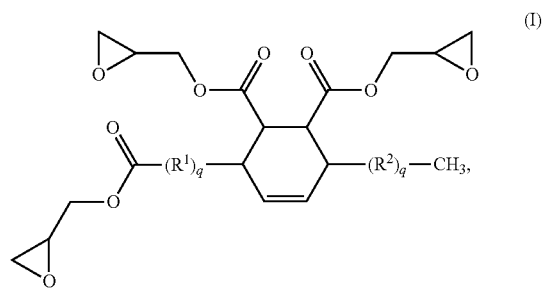

wherein $R^1$ and $R^2$ are each independently straight alkylene chain or a straight alkenylene chain, selected such that together $R^1$ and $R^2$ contain a total of 12 carbons.

In certain embodiments, the one or more compounds having the structure of Formula (I) are selected from:
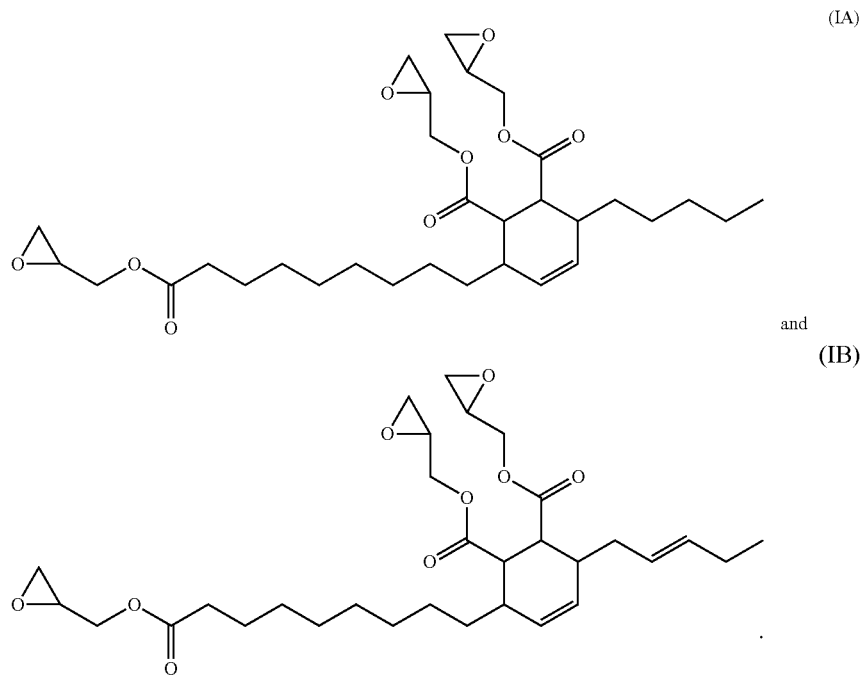
In certain embodiments, the fatty acid epoxy is a compound selected from:
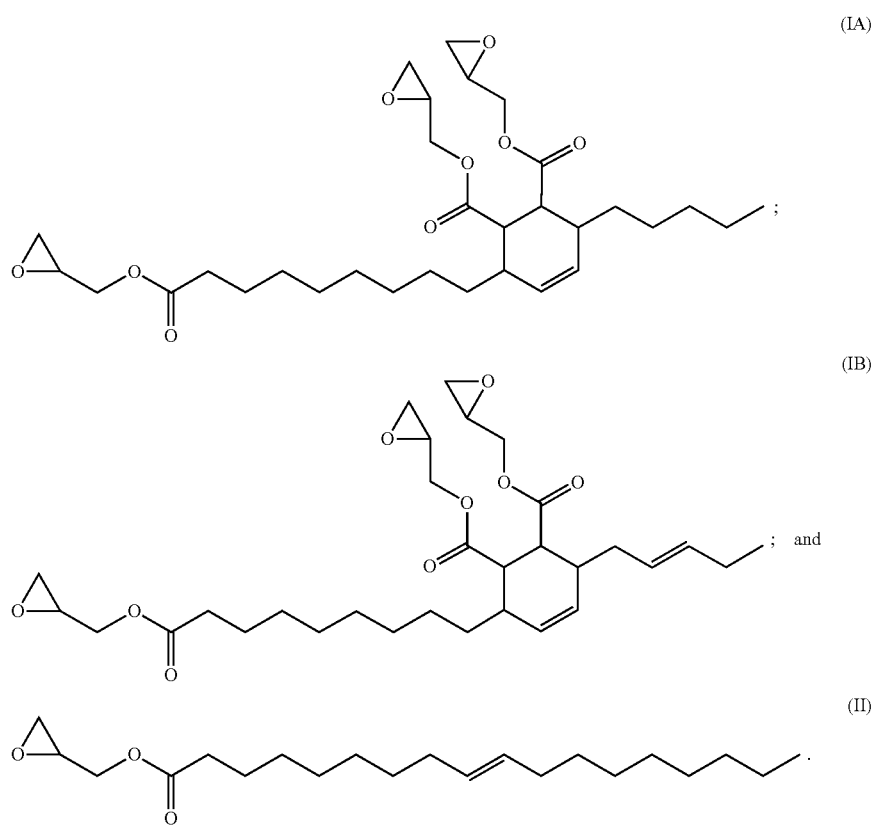

In some embodiments, the fatty acid epoxy is derived from a fatty acid component of a hydrolysis product of vegetable oil. The vegetable oil may be flax seed oil, linseed oil, hempseed oil, or tungsten oil. Vegetable oils contain triglycerides that upon hydrolysis produce a fatty acid component and a glycerol component. In certain embodiments, the fatty acid component of the hydrolysis product comprises about 65% to about 80% polyunsaturated fatty acids, based on total weight of the fatty acid component of the hydrolysis product.

In certain embodiments, the vegetable oil comprises triglycerides having a fatty acid content including linoleic acid (C18:2) and one or more of linolenic acid (C18:3) or eleosteric acid (C18:3).

In particular embodiments, the vegetable oil comprises a triglyceride having a structure of Formula (III):

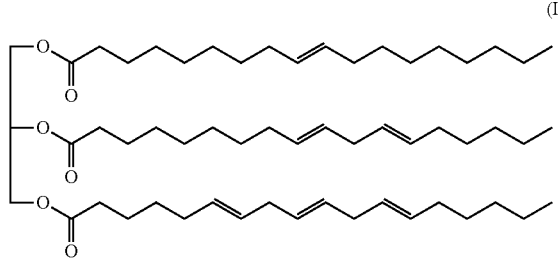

(III)

For preparation of the fatty acid epoxies described herein, detailed methods can be found for example in Li, R. et al., *ACS Sustainable Chem. Eng.* 2018, 6, 4016-4025 and US 2018/0065915.

Hyperbranched Prepolymer

As noted in the Summary of the Invention, epoxy compositions of the present disclosure optionally include a hyperbranched prepolymer.

In some embodiments, the hyperbranched prepolymer has terminal groups comprising epoxide groups, hydroxyl groups, carboxyl groups, or a combination thereof. In certain embodiments, the hyperbranched prepolymer has terminal groups consisting of: epoxide groups and hydroxyl groups; epoxide groups and carboxyl groups; or epoxide groups, hydroxyl groups, and carboxyl groups.

In certain embodiments, the hyperbranched prepolymer has a weight average molecule weight within the range of about 1,000 g/mol to about 10,000 g/mol. In particular embodiments, the hyperbranched prepolymer has a weight average molecule weight within the range of about 1,000 g/mol to about 3,000 g/mol. In particular embodiments, the hyperbranched prepolymer has a weight average molecule weight within the range of about 8,000 g/mol to about 3,000 g/mol.

In certain embodiments, the hyperbranched prepolymer comprises a polymer obtained by polymerizing (i) monomer A having polymerizable epoxy groups or carboxyl groups and (ii) monomer B having three polymerizable hydroxyl groups.

In certain embodiments, monomer A is bisphenol A (BPA) diepoxy, ethylene glycol diepoxy (EGDGE), polyethylene glycol diepoxy (PEGDGE), maleopimaric acid (MPA), or a combination thereof.

In particular embodiments, monomer A is BPA diepoxy. BPA diepoxy is a reaction product of epichlorohydrin and bisphenol A, is commercially available (e.g., DER™ 331, DOW CHEMICAL CO.), and has the following structure:

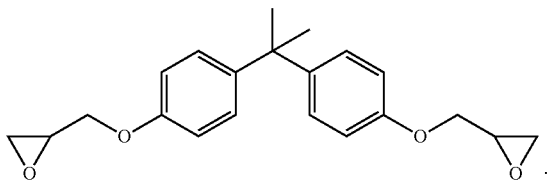 [SMILES: CC(C)(c1ccc(OCC2CO2)cc1)c1ccc(OCC2CO2)cc1 ; "."]

In particular embodiments, monomer A is ethylene glycol or PEG diepoxy. Ethylene glycol diepoxy is commercially available from POLYSCIENCES INC and has the following structure:

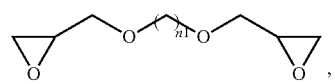

wherein n1 is 2. PEG diepoxy (PEG diglycidyl ether or PEGDGE) is commercially available from SIGMA-ALDRICH and POLYSCIENCES INC (PEGDGE 200, PEGDGE 400, PEGDGE 600, and PEGDGE 100) and comprises the following structure:

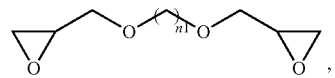

wherein n1 is greater than 2 and up to 12. In particular embodiments, monomer A comprises the following structure:

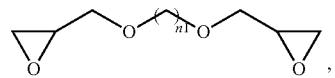

wherein n1 is 2 to 12.

In particular embodiments, monomer A is MPA. MPA can be synthesized as described in Gonis, G. et al. *Eng. Chem. Prod. Res. Dev.* 1973, 12, 4, 326-327 and has the following structure;

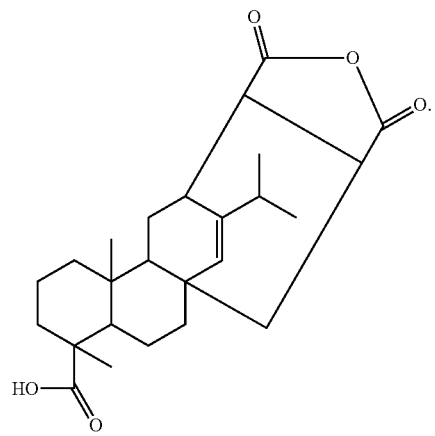 [SMILES: CC(C)C1=CC23CCC4C(C)(C(=O)O)CCCC4(C)C2CC1C1C(=O)OC(=O)C1C3]

In certain embodiments, monomer B is 2-ethyl-2-hydroxymethyl-1,3-propanediol (TMP); 2-hydroxymethyl-2-methyl-1,3-propanediol; 2-hydroxymethyl-1,3-propanediol; 4,4',4''-trihydroxytriphenylmethane (THTPM); or a combination thereof.

In particular embodiments, monomer B is TMP. TMP has the following structure:

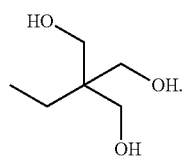

In particular embodiments, monomer B is 2-hydroxymethyl-2-methyl-1,3-propanediol, which has the following structure:

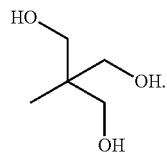

In particular embodiments, monomer B is 2-hydroxymethyl-1,3-propanediol (trimethylolmethane or tris(hydroxymethyl)methane), which has the following structure:

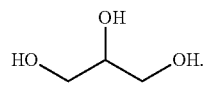

In particular embodiments, monomer B is 4,4',4''-trihydroxyltriphenylmethane (THTPM). THTPM may be synthesized as described in Luo, L., et al. *J. APPL. POLYM. SCI.* 2013, DOI: 10.1002/APP.39257, and has the following structure:

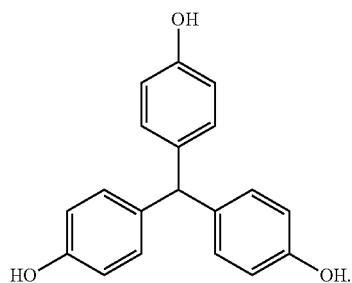

In certain embodiments, the hyperbranched prepolymer comprises a compound having one of the following structures:

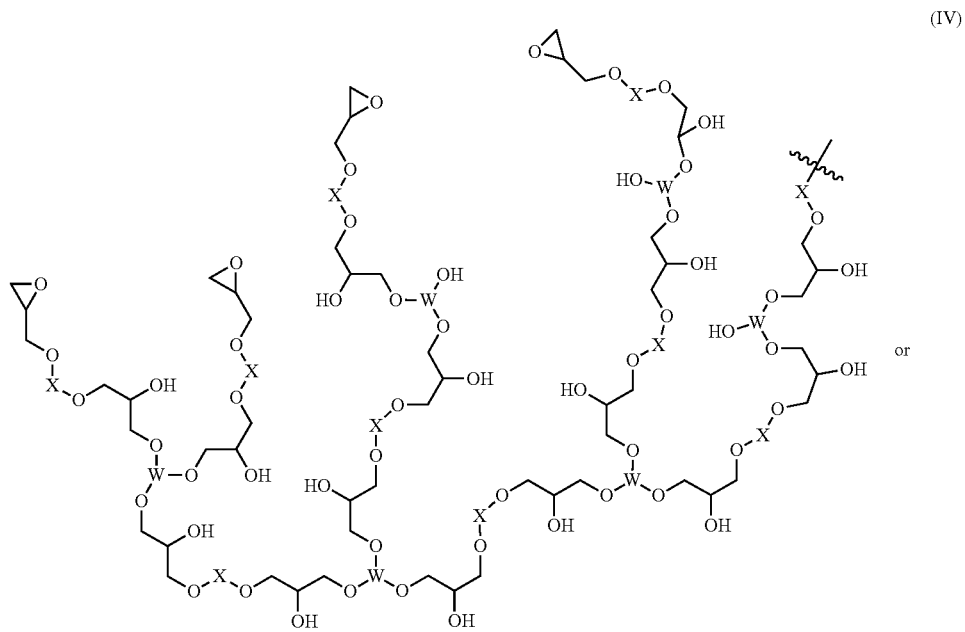

(IV)

or

-continued
(V)
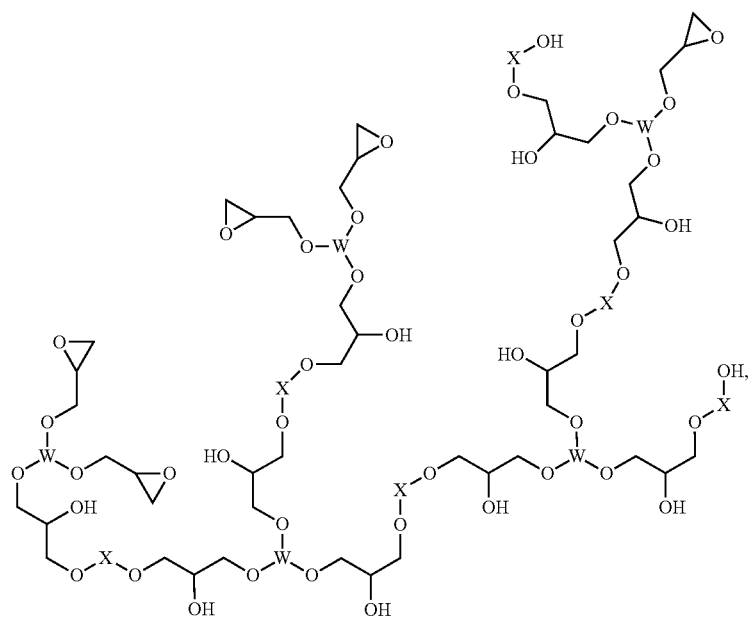
wherein:
X at each occurrence is independently selected from:
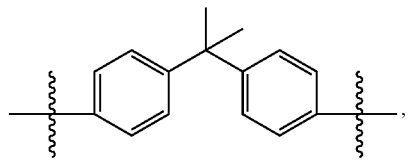
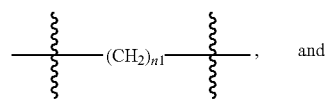
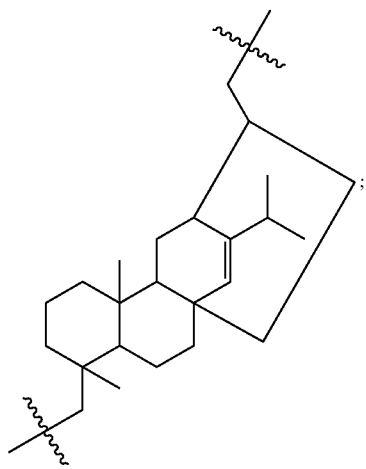
and
W at each occurrence is selected from:
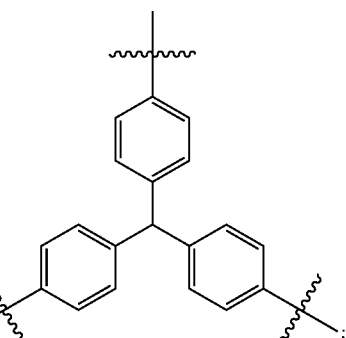
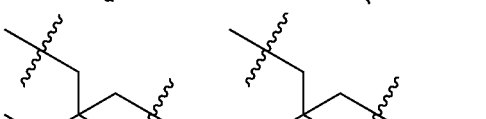
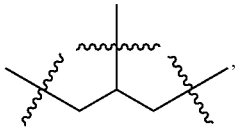
wherein
indicates a continued branch of the hyperbranched prepolymer and wherein n1=2 to 12.

In some embodiments, the prepolymer monomers of the hyperbranched prepolymer further comprise monomer C, having two polymerizable carboxyl groups.

In certain embodiments, the monomer C is selected from:

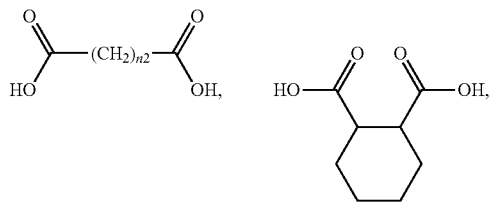

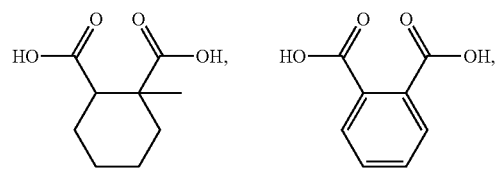

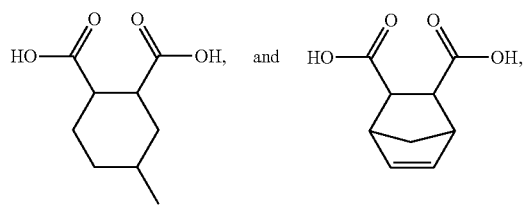

wherein n2 is 2 to 12.

In certain embodiments, the hyperbranched prepolymer comprises a compound having the structure of Formula (VI):

wherein:

X at each occurrence is independently selected from

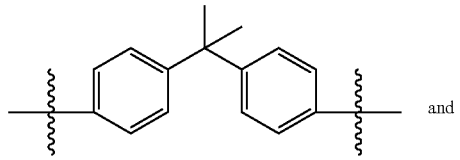
and

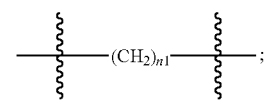
;

W at each occurrence is independently selected from

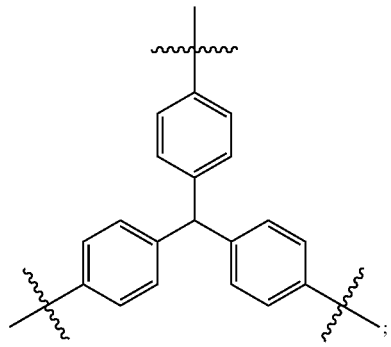
;

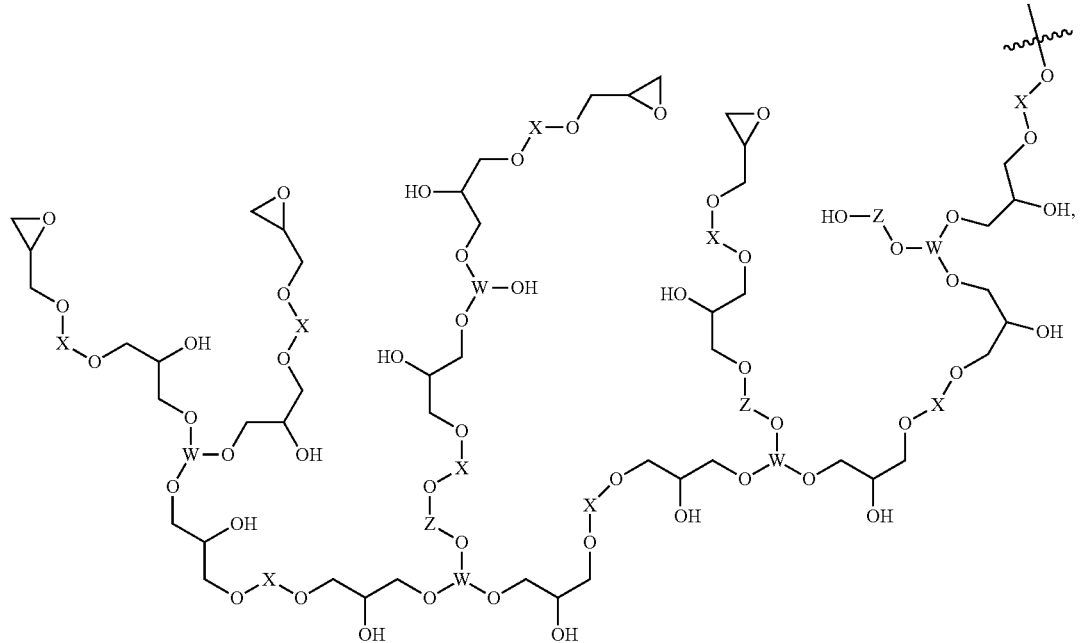

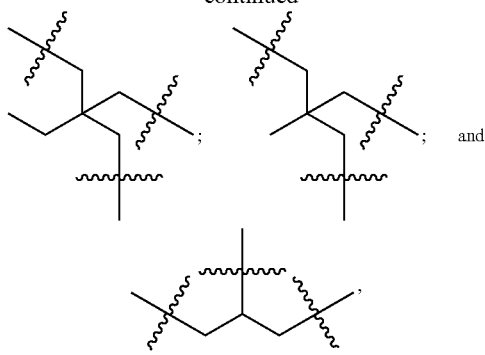

and

Z is selected from

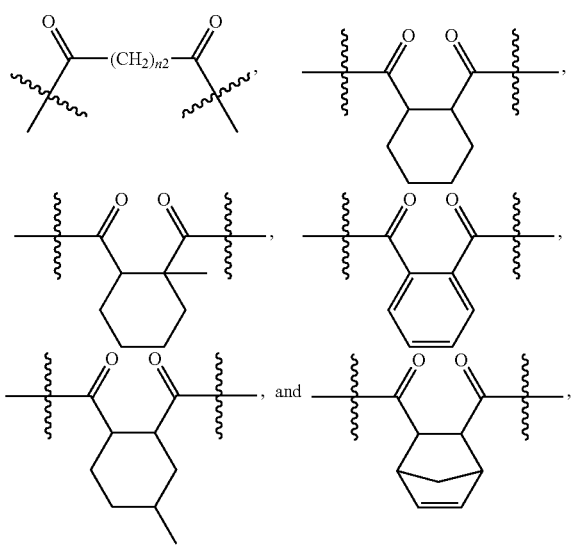

wherein n1 is 2 to 12, n2 is 2 to 12, and

indicates a continued branch of the hyperbranched prepolymer.

For preparation of the hyperbranched prepolymers described herein, detailed methods may be found, for example, in Han J. et al., *Macromolecules*. 2018, 51, 7689-6799, and Luo L. et al., *J. Appl. Polym. Sci.* 2013, DOI: 10.1002/APP.39257.

Non-Coplanar Triepoxy

As noted in the Summary epoxy compositions of the present disclosure include an aromatic non-coplanar triepoxy. In some embodiments, the aromatic non-coplanar triepoxy is a non-coplanar bio-triepoxy, which refers to a non-coplanar triepoxy that is derived from a plant source. In particular embodiments, the non-coplanar bio-triepoxy is a reaction product of vanillin and guiacol.

In certain embodiments, the non-coplanar triepoxy is a compound having the structure of Formula (VII):

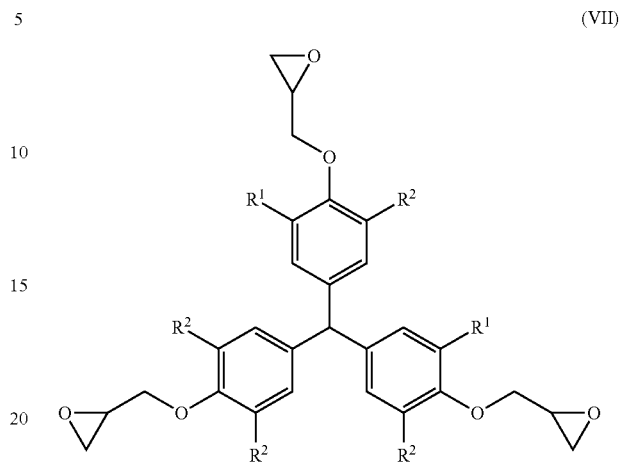

wherein $R^1$ and $R^2$ at each occurrence are independently H, —$OCH_3$, or —$OCH_2CH_3$.

In some embodiments, the compound having the structure of Formula (VII) has the following structure:

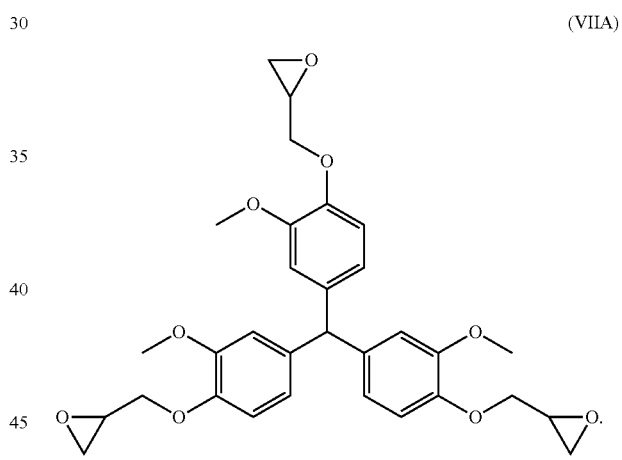

For preparation of aromatic non-coplanar triepoxies described herein, detailed methods may be found, for example, in Liu T. et al. *Macromolecules.* 2018, 51, 5577-5585; Zhao S. et al. *ACS Sustainable Chem. Eng.* 2018, 6, 7600-7608; and Hernandez E. D. et al. *ACS Sustainable Chem. Eng.* 2016, 4 (8), 4328.

Epoxy Compositions

Provided herein are epoxy compositions comprising a fatty acid epoxy, an aromatic non-coplanar triepoxy, and optionally a hyperbranched prepolymer. The epoxy compositions have surprisingly strong performance properties, such as improved Tg, improved mechanical strength, and improved adhesion properties without compromising other properties. The strong performance of the epoxy composition makes possible the use of the fatty acid epoxy as a main matrix component with high loading levels (e.g., up to 80 wt. %). Surprisingly, the prepared epoxy compositions exhibit comparable performance to materials prepared from a commercial BPA epoxy resin.

In some embodiments, the fatty acid epoxy is present in the epoxy composition at a concentration within a range of up to about 80 wt. %. In some embodiments, the fatty acid epoxy is present at a concentration within a range of about 40 wt. % to about 80 wt. %. In some embodiments, the fatty acid epoxy is present at a concentration within a range of about 30 wt. % to about 50 wt. %. In certain embodiments, the fatty acid epoxy is present at a concentration of about 40 wt. %, about 45 wt. %, about 50 wt. %, about 55 wt. %, about 60 wt. %, about 65 wt. %, about 70 wt. %, about 75 wt. %, or about 80 wt. %.

In some embodiments, the hyperbranched prepolymer is present in the epoxy composition at a concentration of about 50 wt. % or less. In certain embodiments, the hyperbranched prepolymer is present at a concentration within a range of about 5 wt. % to about 50 wt. %. In certain embodiments, the hyperbranched prepolymer is present at a concentration of about 5 wt. %, about 10 wt. %, about 15 wt. %, about 20 wt. %, about 25 wt. %, about 30 wt. %, about 35 wt. %, about 40 wt. %, about 45 wt. %, or about 50 wt. %.

In some embodiments, the aromatic non-coplanar triepoxy is present at a concentration of about 50 wt. % or less. In certain embodiments, the aromatic non-coplanar triepoxy is present at a concentration within a range of about 5 wt. % to about 50 wt. %. In some embodiments, the aromatic non-coplanar triepoxy is present at a concentration within a range of about 40 wt. % to about 70 wt. %. In certain embodiments, the aromatic non-coplanar triepoxy is present at a concentration of about 5 wt. %, about 10 wt. %, about 15 wt. %, about 20 wt. %, about 25 wt. %, about 30 wt. %, about 35 wt. %, about 40 wt. %, about 45 wt. %, or about 50 wt. %.

In particular embodiments, the epoxy compositions include the fatty acid epoxy at a concentration of about 60 wt. %, the hyperbranched prepolymer at a concentration of about 20 wt. %, and the aromatic non-coplanar triepoxy at a concentration of about 20 wt. %. Such epoxy compositions may be useful, for example, for producing an anhydride (e.g., nadic methyl anhydride) cured epoxy.

In particular embodiments, the epoxy compositions include the fatty acid epoxy at a concentration of about 40 wt. %, the hyperbranched prepolymer at a concentration of about 40 wt. %, and the aromatic non-coplanar triepoxy at a concentration of about 20 wt. %. Such epoxy compositions may be useful, for example, for producing an amine (e.g., diethylenetriamine) cured epoxy.

In particular embodiments, the epoxy compositions include the fatty acid epoxy at a concentration of about 65 wt. %, the hyperbranched prepolymer at a concentration of about 10 wt. %, and the aromatic non-coplanar triepoxy at a concentration of about 25 wt. %. Such epoxy compositions may be useful, for example, for producing epoxy coating.

In particular embodiments, the epoxy compositions include the fatty acid epoxy at a concentration of about 60 wt. %, the hyperbranched prepolymer at a concentration of about 10 wt. %, and the aromatic non-coplanar triepoxy at a concentration of about 30 wt. %. Such epoxy compositions may be useful, for example, for producing an epoxy composite.

In particular embodiments, the epoxy compositions include the fatty acid epoxy at a concentration of about 40 wt. % and the aromatic non-coplanar triepoxy at a concentration of about 60 wt. %. In particular embodiments, the epoxy composition does not include a hyperbranched prepolymer. In particular embodiments the epoxy composition does not include a component that is derived from BPA.

Methods of Use

In some aspects, provided herein are methods of producing a cured epoxy. In embodiments, the method comprises mixing an epoxy composition as described herein with a curing agent to produce a curing mixture, and polymerizing the curing mixture. Polymerizing the curing mixture may be achieved by maintaining the curing mixture at a temperature and time period sufficient for polymerizing the epoxy composition, thereby producing a cured epoxy.

In some embodiments, the curing agent is an anhydride-based curing agent or an amine-based curing agent. In particular embodiments, the curing agent is an anhydride-based curing agent. Anhydride-based curing agents include phthalic anhydride, pyromellitic dianhydride, chlorendic anhydride, and nadic methyl anhydride (NMA). In particular embodiments, the curing agent is an amine-based curing agent. Examples of amine-based curing agents include triethylenetetramine (TTA), tetraethylenepentamine (TEPA), diethylaminopropylamine (DEAPA), and diethylenetriamine (DETA).

In particular embodiments, the curing agent is an anhydride-based curing agent. In some embodiments, the curing mixture comprises an anhydride-based curing agent at a concentration within a range of about 70 wt. % to about 90 wt. %. In particular embodiments, the curing mixture comprises an anhydride-based curing agent at a concentration of about 80 wt. %.

In particular embodiments, the curing agent is an amine-based curing agent. In some embodiments, the curing mixture comprises an amine-based curing agent at a concentration within a range of about 5 wt. % to about 25 wt. %. In particular embodiments, the curing mixture comprises an anhydride-based curing agent at a concentration of about 15 wt. %.

In some embodiments, the temperature that is sufficient for polymerizing the epoxy composition is at least 20° C.

In particular embodiments, the temperature is 75° C. or greater. At temperatures of 75° C. or greater the polymerizing may be achieved by maintaining the curing mixture at the temperature for as few as fifteen minutes, thirty minutes, one hour, or two hours. In particular embodiments, the temperature is about 25° C. In particular embodiments, the temperature is 75° C. or greater and the time period is at least about 30 minutes.

At a temperature of about 25° C. polymerizing may be achieved by maintaining the curing mixture at the temperature for a time period of at least about 6 hours, at least about 8 hours, at least about 10 hours, at least about 12 hours, at least about 18 hours, at least about 24 day, or at least about 2 days. In particular embodiments, the temperature is about 25° C. and the time period is at least about 24 hours.

In some embodiments, one or more additional components are added to the curing mixture. Examples of additional components that may be added include accelerators, hardeners, pigments, and fillers.

In particular embodiments, the curing mixture further comprises an accelerator. Accelerators may be added to accelerate the curing reaction. Examples of accelerators include tertiary amines, carboxylic acids and alcohols (especially phenols). In particular embodiments, an accelerator is added to the curing mixture at a concentration of about 0.1 wt. % to about 1 wt. %. In particular embodiments, the accelerator comprises diethyl methyl imidazole.

In some aspects, the methods described herein may be useful for producing, for example, epoxy adhesives, epoxy coatings, and epoxy composites.

In particular embodiments, the polymerizing is performed with the curing mixture impregnated into a matrix material, to produce an epoxy composite. In particular embodiments, the matrix material comprises glass fibers, carbon fibers, inorganic filler particles, or combinations thereof. Examples of glass fibers include fiberglass, E glass fiber, S glass fiber, and C glass fiber. Examples of inorganic filler particles include nano clay, silicon dioxide, calcium oxide, boron fiber, quartz, aluminium oxide, and silicon carbide or disilicon carbide containing titanium fiber. Examples of carbon fibers include graphite fiber, carbon nanotubes, and nano composite fibers. Other matrix materials include poly paraphenylene terephthalamide, poly(p-phenylene benzobisoxazole) fiber, ultrahigh molecular weight polyethylene fibers, high and low density polyethylene fibers, polypropylene fibers, nylon fibers, and biodegradable natural fibers such as cellulose fibers.

In particular embodiments, the polymerizing is performed within a mold. For example, the curing mix may be prepared and then poured into the mold prior to the polymerizing. The cured epoxy obtained after polymerizing replicate the shape of the mold. The mold may be made of, for example, metal, silicon, or plastic.

In particular embodiments, the polymerizing is performed on at least a portion of a surface of an article, resulting in an epoxy coating on the article. Epoxy coatings may be used on a variety of surfaces, such as wood, metal, glass, stone, cement, ceramic (e.g., tile), thermoplastics such as polyethylene or vinyl, thermosets such as polyeurethane, and any material used as a flooring. In particular embodiments, the surface of the article comprises wood, metal, glass, stone, cement, ceramic, a thermoplastic, or a thermoset.

In particular embodiments, the the polymerizing is performed between a portion of a surface of a first article and a portion of a surface of a second article, resulting in adhesion of the first article to the second article. Epoxy adhesives may be used to adhere a variety of surfaces, such as wood, metal, glass, stone, cement, thermoplastics such as polyethylene or vinyl, and thermosets. In particular embodiments, the surface of the first article or the surface of the second article comprises wood, metal, glass, stone, cement, ceramic, a thermoplastic, or a thermoset.

Cured Epoxies

In some aspects, provided herein are cured epoxies comprising a polymerized reaction product of an epoxy composition as described herein and one or more curing agents. The curing agent may be, for example, an anhydride-based curing agent or an amine-based curing agent such as those previously described.

In certain aspects, provided herein are articles comprising a cured epoxy. In some embodiments, the articles comprising the cured epoxy have performance properties that are equivalent to those of an article comprising a BPA based cured epoxy. Performance properties may include, for example, glass transition temperature, viscosity, tensile strength, impact strength, peel strength, modulus, pencil hardness, adhesion, and solvent resistance. Methods for measuring such performance properties are known by those of skill in the art and are published by the American Society for Testing Materials (ASTM). For pencil hardness, the cured epoxy may be considered to have equivalent or better hardness than a BPA based epoxy if the pencil hardness grade is the same or is graded as harder. For strength based performance properties (e.g., tensile strength, impact strength, and peel strength), a cured epoxy may be considered to have equivalent or better adhesion than a BPA based epoxy if the strength value is within ±20% (or greater) than the strength value measured for the BPA based epoxy. For glass transition temperature, Tg, a cured epoxy may be considered to have an equivalent or better performance than a BPA based epoxy if the Tg is within ±20° C. of the Tg for a cured BPA based epoxy.

In particular embodiments, the cured epoxy comprises a glass transition temperature, Tg, of at least about 40° C., at least about 45° C., at least about 50° C., or at least about 55° C. In particular embodiments, the cured epoxy comprises a glass transition temperature within a range of about 50° C. to about 70° C. In particular embodiments, the cured epoxy comprises a peel strength of at least about 6 N/mm, at least about 7 N/mm, or at least about 8 N/mm.

In certain aspects, provided herein are articles comprising a surface coated with a coating comprising a cured epoxy. In particular embodiments, the coating comprises a primer. In particular embodiments, the epoxy coating has a layer thickness within a range of about 100 µm and about 10 mm. In particular embodiments, the coating has a layer thickness of about 50 µm, about 100 µm, about 150 µm, about 200 µm, or about 250 µm. In certain embodiments, the epoxy coating has glass transition temperature of at least about 40° C. or at least about 45° C. In particular embodiments, the epoxy coating has a pencil hardness of 5B or harder (see ASTM D3363). In particular embodiments, the epoxy coating has a pencil hardness that is at least as hard as a BPA based epoxy coating cured using the same curing agent.

In certain aspects, provided herein are structures comprising a first surface and an opposing second surface joined by an adhesive bonded to the first surface and the opposing second surface, the adhesive comprising a cured epoxy. Epoxy adhesives may be useful, for example, for construction of aircraft, automobiles, bicycles, boats, golf clubs, skis, snowboards, and other applications where high strength bonding is required. In particular embodiments, the adhesive has one or more performance properties that are equivalent to or better than a BPA based epoxy adhesive. A cured epoxy may be considered to have equivalent or better adhesion than a BPA based epoxy if the adhesion grade is the same or a higher level of adhesion than the BPA based epoxy as measured by a standard tape test (see ASTM D3359).

In certain aspects, provided herein are composite articles comprising fibers or particles of a matrix material and a cured epoxy as described herein, wherein the fibers or particles of the matrix material are embedded within the polymerized product of the cured epoxy. In particular embodiments, the composite article comprises a glass fiber composite article, a carbon fiber composite article, a magnetic composite article (see Gu, H. et al., ACS Appl. Mater. Interfaces 2012, 4, 10, 5613-5624), a flame-retardant composite article (see Jiang, J. et al. *J. Mater. Chem. A*, 2015, 3, 4284-4290), or a combination thereof.

The following Examples may be used by one skilled in the art to demonstrate the improved properties of the epoxy compositions of the invention.

EXAMPLES

Example 1

Preparation of Anhydride Cured Hempseed Oil Fatty Acid-Derived Epoxy Containing Bio-Triepoxy and Hyperbranched Prepolymer For production of an anhydride cured epoxy, 60 parts by weight of hempseed oil fatty acid epoxy (FA-EP) prepared as described in Li, R. et al., ACS Sustainable Chem. Eng. 2018, 6, 4016-4025 and US20180065915A1, 20 parts of an aromatic non-coplanar triepoxy of Formula (VIIA) and 20 parts of a hyperbranched prepolymer (HBP) of Formula IV were mixed under magnetic stirring at room temperature. After a homogeneous mixture was obtained, 80 parts of nadic methyl anhydride (NMA) as curing agent was added at room temperature. Finally, diethyl methyl imidazole, the accelerator, was added. After a homogeneous mixture was formed, it was degassed and cured in a metal mold. The curing was a three-step process: 100° C. for 2 hours, 150° C. for 3 hours, and 180° C. for 2 hours. After curing, the sample was allowed to cool down naturally to room temperature. The cured product exhibited similar properties as the NMA cured BPA epoxy system.

TABLE 1

|  | Viscosity$^a$ (Pa·s) | Tg (° C.) | Tensile strength (mpa) | Impact strength (kj/m$^2$) |
|---|---|---|---|---|
| Resin from Example 1 | 1.6 | 105.5 | 65.1 | 23.8 |
| NMA cured BPA epoxy | 2.7 | 135.1 | 68.5 | 15.6 |

$^A$Viscosity of resin before curing, and the test was performed at 25° C.

Example 2

Preparation of Amine Cured Bio-Based Epoxy Composition

Under magnetic stirring, 40 parts by weight of the hempseed oil fatty acid-derived epoxy (FA-EP), 20 parts of the bio-triepoxy and 40 parts of hyperbranched prepolymer (HBP) were mixed at room temperature. The FA-EP, the bio-triepoxy, and the HBP were the same as those used in Example 1. After a homogeneous mixture was obtained, 15 parts of diethylenetriamine (DETA) as curing agent was added under continuous stirring at room temperature. After a homogeneous mixture was formed, it was degassed and cured in a metal mold. The curing was a one-step process: 95° C. for 30 min After curing, the sample was allowed to cool down naturally to room temperature. As shown in Table 2, the cured product exhibited similar properties as the commercial ENTROPY RESINS® (GOUGEON BROTHERS, INC., Bay City, Michigan) epoxy resin system, which is an epoxy system with BPA epoxy as a main component and has a bio-based component that is approximately 30% of the composition.

TABLE 2

|  | Viscosity$^a$ (Pa·s) | Tg (° C.) | Peel strength$^b$ (N/mm) | Modulus (MPa) |
|---|---|---|---|---|
| Resin from Example 2 | 4.9 | 52.7° C. | 9.0 | 1990 |
| Commercial Entropy Epoxy Resin | 3.7 | 59.9° C. | 10.4 | 2060 |

$^a$Viscosity of resin before curing. Test performed at 25° C.
$^b$Peel strength of adhesively bonded resin and polyethylene.

Additionally, DETA epoxies with varied ratios of the fatty acid epoxy, the hyperbranched polymer (HBP) and the aromatic non-coplanar triepoxy were evaluated. Results are shown in Table 3.

TABLE 3

| Resin$^a$ | FA-EP (part) | Bio-triepoxy (part) | HBP (part) | Peel strength$^b$ (N/mm) | T$_g$ (° C.) |
|---|---|---|---|---|---|
| Resin 0 | 100 | 0 | 0 | 2.1 | 23.6 |
| Resin 1 | 40 | 20 | 40 | 9.0 | 57.2 |
| Resin 2 | 40 | 40 | 20 | 7.6 | 64.8 |
| Resin 3 | 40 | 60 | 0 | 5.3 | 73.6 |

$^a$The resin was cured with 15 parts DETA at 90° C. for 30 min;
$^b$peel strength of adhesively bonded resin and polyethylene.

Example 3

Preparation of a Bio-Based Epoxy Coating

Under magnetic stirring, 65 parts by weight of hempseed oil fatty acid-derived epoxy (FA-EP), 25 parts of bio-triepoxy and 10 parts of hyperbranched prepolymer (HBP) were mixed at room temperature. The FA-EP, the bio-triepoxy, and the HBP were the same as those used in Example 1. After a homogeneous mixture was obtained, 15 parts of diethylenetriamine (DETA) as curing agent was added under continuous stirring at room temperature. After a homogeneous mixture was formed, it was degassed and coated onto a tin plate with a layer thickness of ~100 μm. The curing was performed at room temperature (25° C.) for 3 days. The prepared coating exhibited similar properties as the DETA cured BPA epoxy resin system (Table 4).

TABLE 4

|  | Viscosity$^a$ (Pa·s) | T$_g$ (° C.) | Pencil hardness$^b$ | Adhesion$^c$ | Solvent resistance (rub test) |
|---|---|---|---|---|---|
| Resin from example 3 | 0.8 | 48.6 | 5H | 5B | >400 |
| DETA cured BPA epoxy | 5.3 | 49.7 | 5H | 5B | >400 |

$^a$Viscosity of resin before curing, and the test was performed at 25° C.;
$^b$the hardness of the coating was monitored by pencil test according to ASTM D3363;
$^c$the adhesion property of the coating was measured by tape test, according to ASTM D3359-17;
$^d$the solvent resistance of the coating was determined using solvent rubs according to ASTM D5402-15.

Example 4

Glass Fiber Reinforced Bio-Based Epoxy Composites by Manual Impregnation

A glass fiber sheet of 250×250 mm was placed on a Teflon film. This was then manually impregnated with resin (a mixture composed of FA-EP (60 parts), bio-triepoxy (30 parts), HBP (10 parts) and DETA (15 parts)) using a brush. The FA-EP, the bio-triepoxy, and the HBP were the same as those used in Example 1. Subsequently, another glass fiber sheet of 250×250 mm was placed on top of it and the same operation was repeated until a total of 8 impregnated layers were completed. The system was sealed with a vacuum bag. The enclosed part was then compacted by applying vacuum. Once air was evacuated, curing was carried out in an oven at 95° C. for 30 min. After curing, the sample was allowed to cool down naturally to room temperature.

All of the U.S. patents, U.S. patent application publications, U.S. patent applications, foreign patents, foreign patent applications and non-patent publications referred to in this specification are incorporated herein by reference in their entireties.

Although the foregoing invention has been described in some detail to facilitate understanding, it will be apparent that certain changes and modifications may be practiced within the scope of the appended claims. Accordingly, the described embodiments are to be considered as illustrative and not restrictive, and the invention is not to be limited to the details given herein, but may be modified within the scope and equivalents of the appended claims.

What is claimed is:

1. An epoxy composition comprising:
  a fatty acid epoxy selected from:

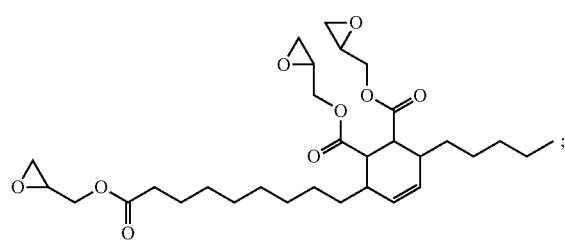
(IA)

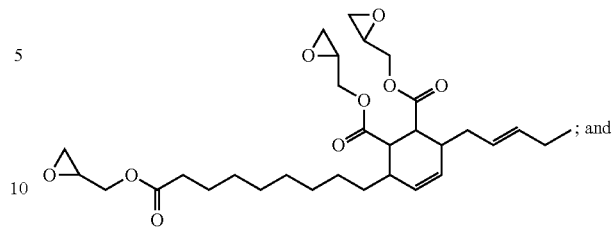
(IB)

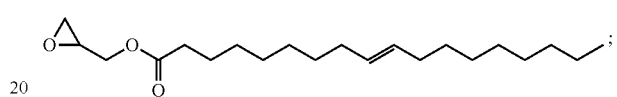
(II)

a hyperbranched prepolymer having terminal groups comprising epoxide groups, hydroxyl groups, carboxyl groups, or a combination thereof; and
an aromatic non-coplanar triepoxy.

2. The epoxy composition of claim 1, wherein the hyperbranched prepolymer has terminal groups consisting of: epoxide groups and hydroxyl groups; epoxide groups and carboxyl groups; or epoxide groups, hydroxyl groups, and carboxyl groups.

3. The epoxy composition of claim 1, wherein the hyperbranched prepolymer comprises a compound having one of the following structures:

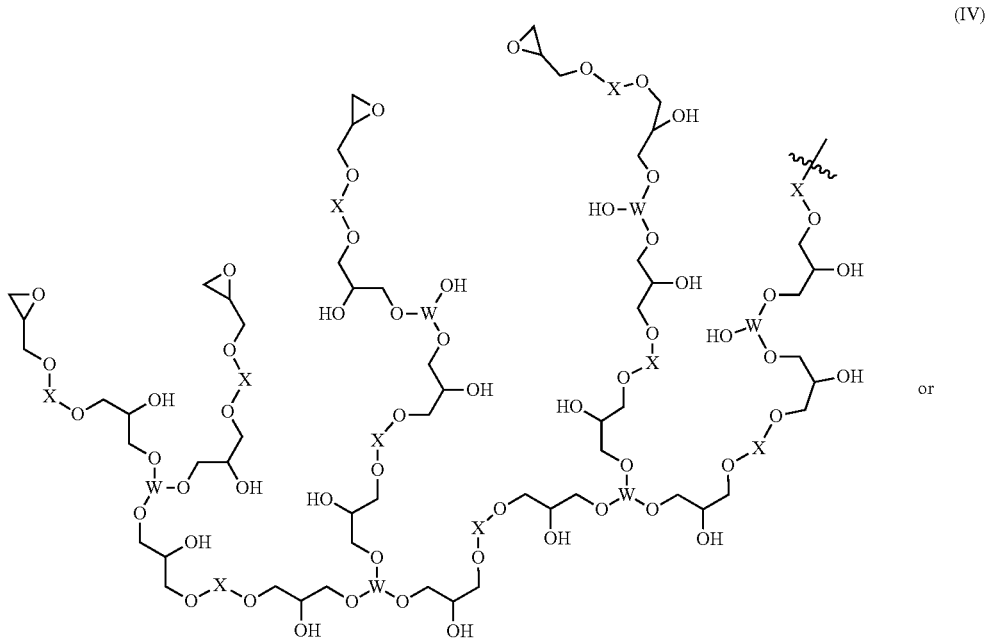
(IV)

(V)
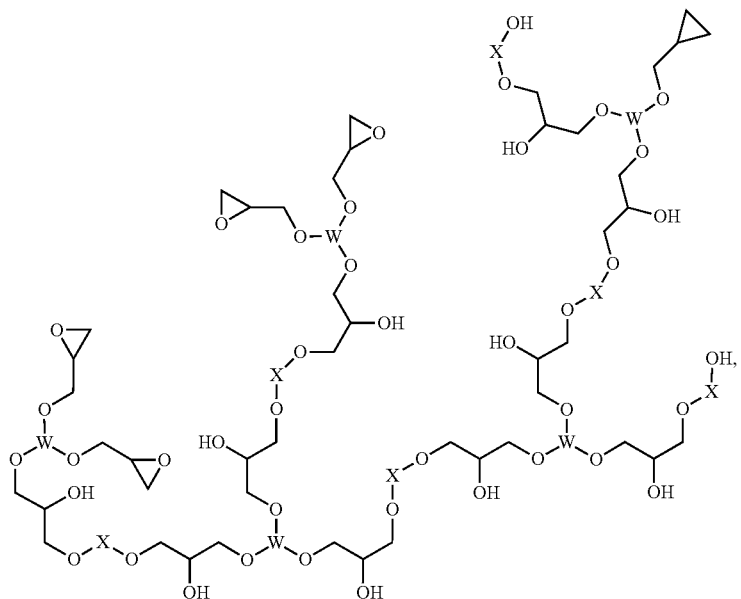
wherein:
X is:
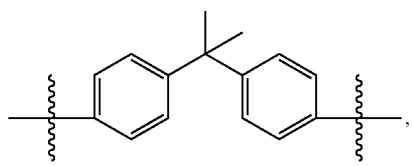
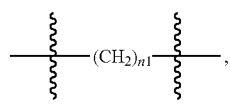
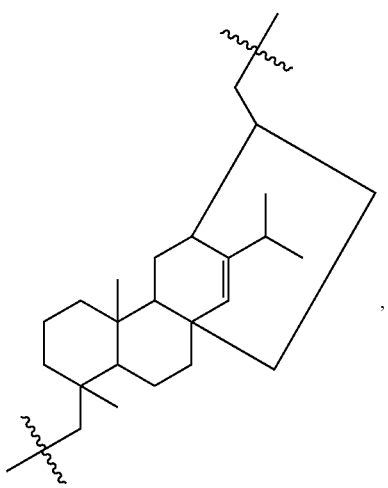
or a combination thereof; and
W is:
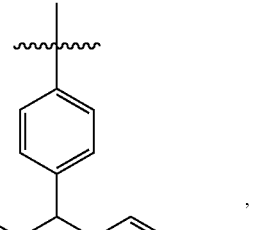
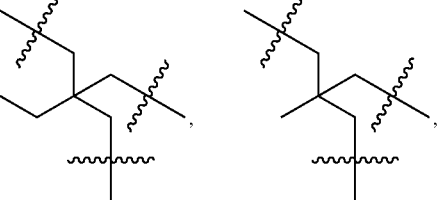
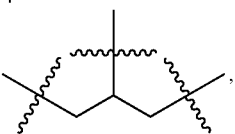
or a combination thereof,
wherein
indicates a continued branch of the hyperbranched prepolymer and wherein n1=2 to 12.

4. The epoxy composition of claim 1, wherein the hyperbranched prepolymer comprises a compound having the structure of Formula (VI):
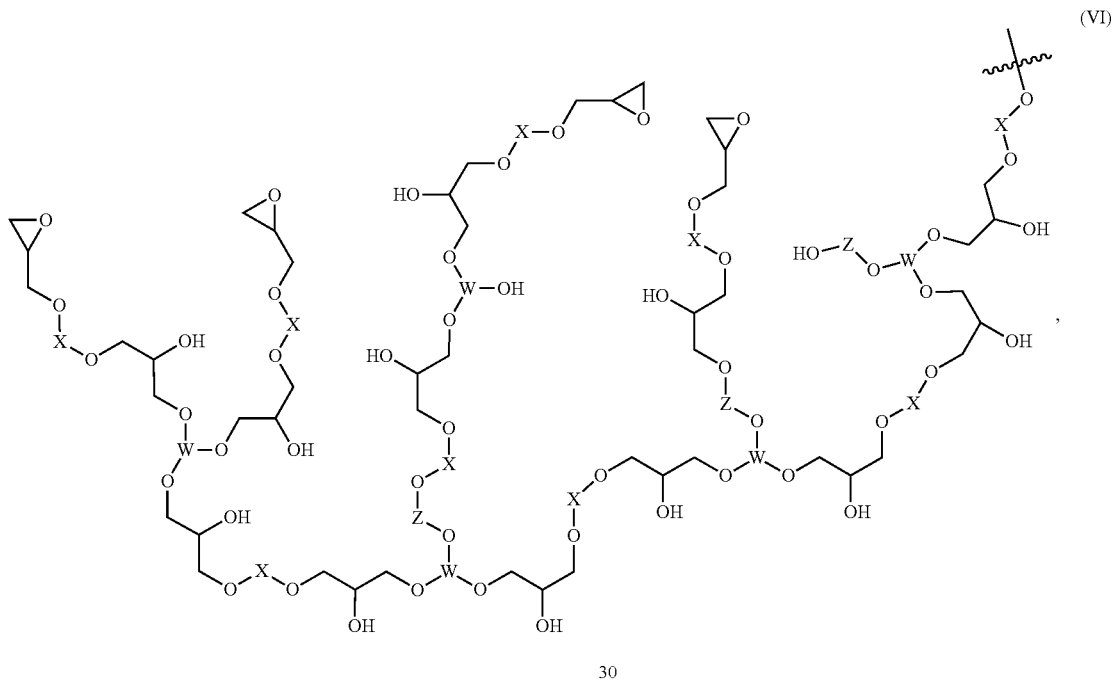
wherein:
X at each occurrence is independently selected from
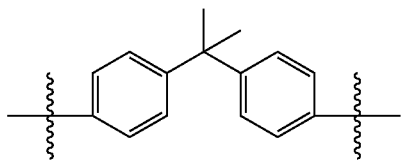
and
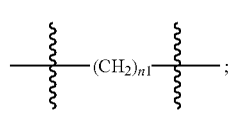
W at each occurrence is independently selected from
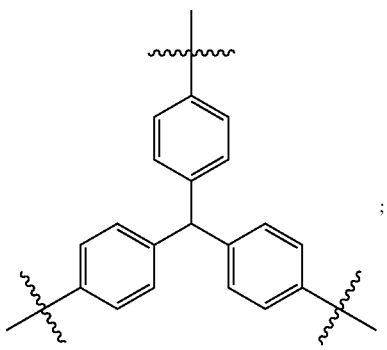
-continued
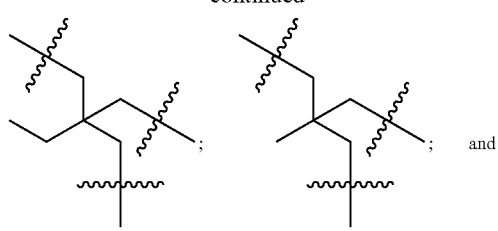
and
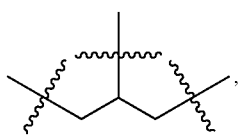
and
Z is selected from
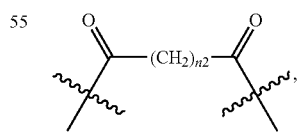
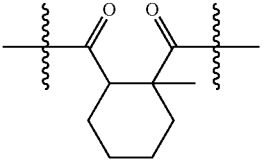
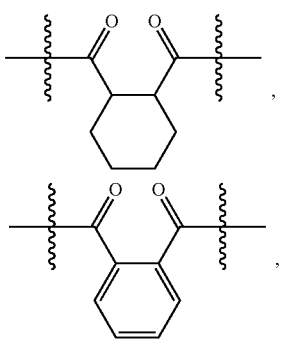

-continued

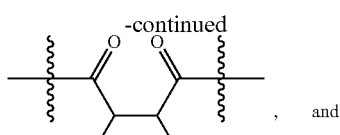

, and

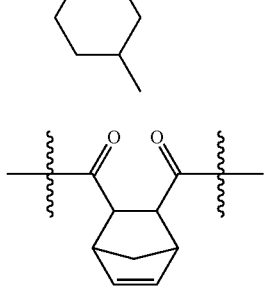

wherein n1 is 2 to 12, n2 is 2 to 12, and

indicates a continued branch of the hyperbranched prepolymer.

5. The epoxy composition of claim 1, wherein the aromatic non-coplanar triepoxy is a compound having the structure of Formula (VII):

(VII)

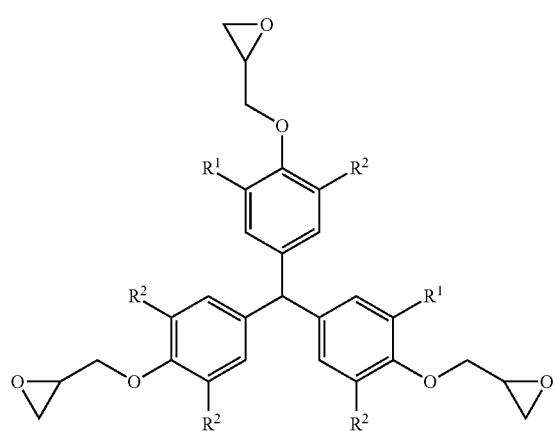

wherein $R^1$ and $R^2$ at each occurrence are independently H, —OCH$_3$, or —OCH$_2$CH$_3$.

6. The epoxy composition of claim 5, wherein the compound having the structure of Formula (VII) has the following structure:

(VIIA)

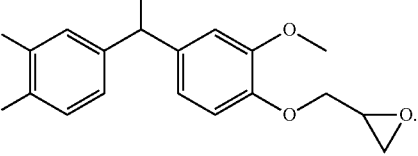

7. The epoxy composition of claim 1, wherein the fatty acid epoxy is present at a concentration of about 60% wt. %, the hyperbranched prepolymer is present at a concentration of about 20 wt. %, and the aromatic non-coplanar triepoxy is present at a concentration of about 20 wt. %, based on total weight of the epoxy composition.

8. An epoxy composition comprising a fatty acid epoxy selected from:

(IA)

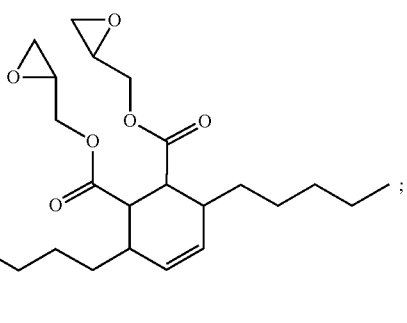

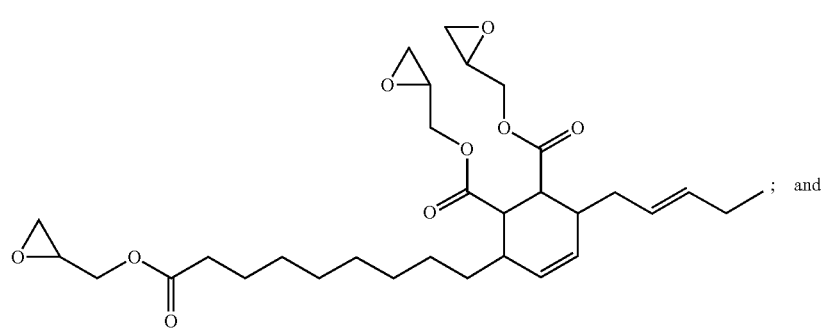

(IB)

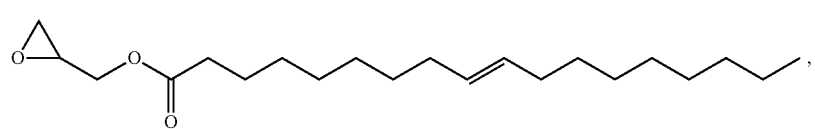

(II)

and an aromatic non-coplanar triepoxy.

9. The epoxy composition of claim 8, wherein the aromatic non-coplanar triepoxy is a compound having the structure of Formula (VII):

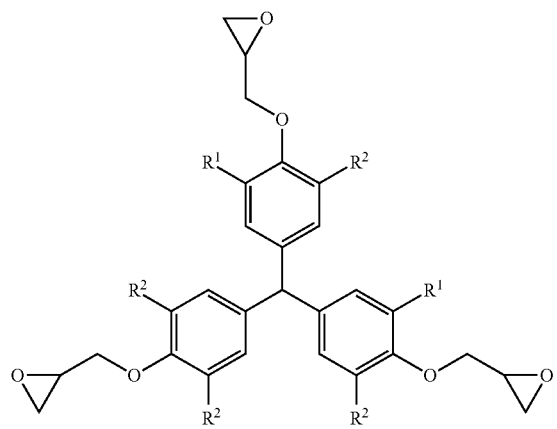

(VII)

wherein $R^1$ and $R^2$ at each occurrence are independently H, —OCH$_3$, or —OCH$_2$CH$_3$.

10. The epoxy composition of claim 9, wherein the compound having the structure of Formula (VII) has the following structure:

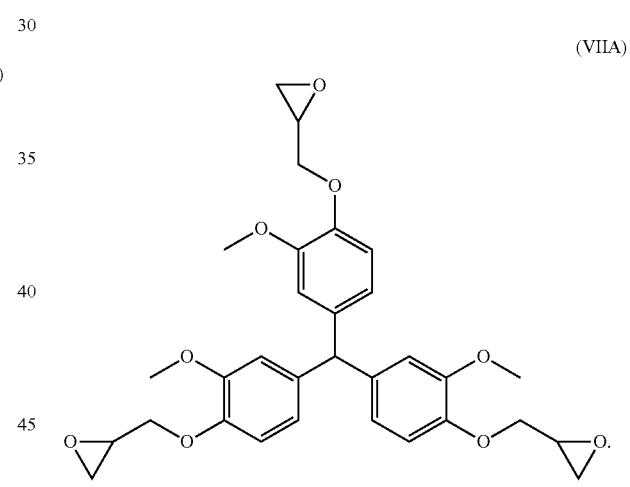

(VIIA)

11. A method of producing a cured epoxy, the method comprising mixing an epoxy composition comprising:
a fatty acid epoxy selected from:

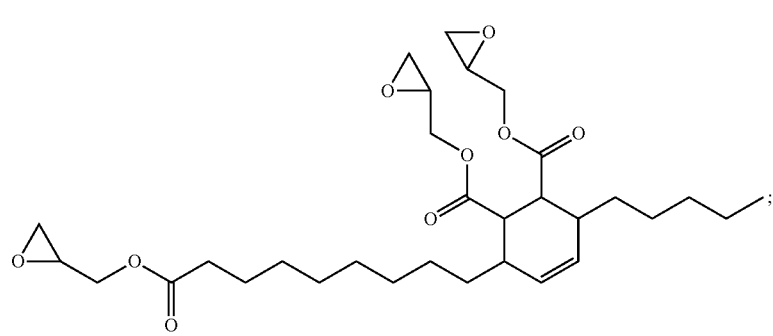

(IA)

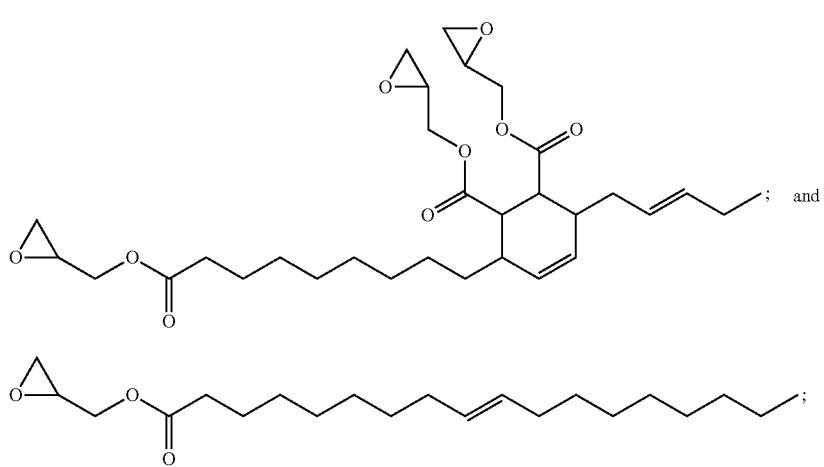

a hyperbranched prepolymer having terminal groups comprising epoxide groups, hydroxyl groups, carboxyl groups, or a combination thereof; and
an aromatic non-coplanar triepoxy,
with a curing agent to produce a curing mixture, and
polymerizing the curing mixture by maintaining the curing mixture at a temperature and time sufficient for polymerizing the epoxy composition, thereby producing a cured epoxy.

12. The method of claim 11, wherein the curing agent comprises an anhydride curing agent or an amine curing agent.

13. The method of claim 11, wherein the curing mixture further comprises an accelerator added to the curing mixture at a concentration of about 0.1 wt. % to about 1 wt. %, based on total weight of the curing mixture.

14. The method of claim 11, wherein the polymerizing is performed between a portion of a surface of a first article and a portion of a surface of a second article, resulting in adhesion of the first article to the second article.

* * * * *